(12) United States Patent
Oh et al.

(10) Patent No.: US 9,331,926 B2
(45) Date of Patent: *May 3, 2016

(54) SYSTEM AND METHOD FOR PRESENCE NOTIFICATION BASED ON PRESENCE ATTRIBUTE

(71) Applicant: Samsung Electronics Co., Ltd., Gyeonggi-do (KR)

(72) Inventors: Jae-Kwon Oh, Seoul (KR); Mayuresh Madhukar Patil, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/476,352

(22) Filed: Sep. 3, 2014

(65) Prior Publication Data

US 2014/0372608 A1  Dec. 18, 2014

Related U.S. Application Data

(63) Continuation of application No. 12/377,822, filed as application No. PCT/KR2007/003898 on Aug. 14, 2007, now Pat. No. 8,849,986.

(30) Foreign Application Priority Data

Aug. 14, 2006  (IN) ............................. 1442/CHE/2006
Aug. 14, 2007  (KR) ........................ 10-2007-0081530

(51) Int. Cl.
*H04L 12/28* (2006.01)
*H04L 12/26* (2006.01)
(Continued)

(52) U.S. Cl.
CPC ................ *H04L 43/10* (2013.01); *H04L 67/22* (2013.01); *H04L 67/24* (2013.01); *H04L 67/306* (2013.01); *H04L 67/42* (2013.01); *H04M 3/42374* (2013.01)

(58) Field of Classification Search
CPC ....... H04L 67/24; H04L 67/22; H04L 67/306; H04L 67/42; H04L 43/10; H04L 63/10; H04M 3/42374
USPC .................................................. 709/224–225
See application file for complete search history.

(56) References Cited

U.S. PATENT DOCUMENTS 6,167,448 A   12/2000  Hemphill et al.
6,757,722 B2   6/2004  Lonnfors et al.
(Continued)

FOREIGN PATENT DOCUMENTS

CN   1526246   9/2004
CN   1685753   10/2005
(Continued)

OTHER PUBLICATIONS

Korean Language PCT Report PCT/KR2007/003898.
(Continued)

*Primary Examiner* — Alina N Boutah
(74) *Attorney, Agent, or Firm* — The Farrell Law Firm, P.C.

(57) ABSTRACT

Methods and apparatuses are provided for providing a presence notification. A presence server receives a request including a filtering rule from a watcher client. The filtering rule is defined based on presence attributes of the watcher client. The presence server stores a notification blocking filter corresponding to the filtering rule, when the request has been authorized using authorization related information.

17 Claims, 7 Drawing Sheets

(51) Int. Cl.
*H04L 29/08* (2006.01)
*H04L 29/06* (2006.01)
G06F 15/173 (2006.01)
H04M 3/42 (2006.01)

(56) References Cited

U.S. PATENT DOCUMENTS

| | | | |
|---|---|---|---|
| 7,035,923 | B1 | 4/2006 | Yoakum et al. |
| 7,480,915 | B2 * | 1/2009 | Costa Requena et al. .... 719/311 |
| 8,701,027 | B2 | 4/2014 | van Dantzich et al. |
| 2003/0048195 | A1 | 3/2003 | Trossen |
| 2003/0065788 | A1 | 4/2003 | Salomaki |
| 2004/0015569 | A1 * | 1/2004 | Lonnfors .............. H04L 12/581 709/220 |
| 2004/0098491 | A1 * | 5/2004 | Costa-Requena et al. .... 709/229 |
| 2004/0122896 | A1 * | 6/2004 | Gourraud ...................... 709/204 |
| 2004/0122977 | A1 | 6/2004 | Moran et al. |
| 2004/0128359 | A1 | 7/2004 | Horvitz et al. |
| 2005/0135240 | A1 * | 6/2005 | Ozugur ........................ 370/229 |
| 2005/0154698 | A1 * | 7/2005 | Ikezawa et al. ................... 707/1 |
| 2005/0228895 | A1 * | 10/2005 | Karunamurthy et al. ..... 709/229 |
| 2005/0255811 | A1 * | 11/2005 | Allen ................. H04W 76/005 455/78 |
| 2005/0282526 | A1 | 12/2005 | Leppanen et al. |
| 2006/0080428 | A1 | 4/2006 | Trossen et al. |
| 2006/0149816 | A1 | 7/2006 | Cadiz et al. |
| 2006/0248184 | A1 * | 11/2006 | Wu ........................ H04L 67/14 709/224 |
| 2006/0286993 | A1 * | 12/2006 | Xie et al. ...................... 455/518 |
| 2007/0010275 | A1 | 1/2007 | Kiss |
| 2007/0127505 | A1 | 6/2007 | Laurila et al. |
| 2007/0136475 | A1 | 6/2007 | Leppisaari et al. |
| 2007/0189301 | A1 | 8/2007 | Kiss et al. |
| 2007/0214243 | A1 | 9/2007 | Bao et al. |
| 2007/0226295 | A1 | 9/2007 | Haruna et al. |
| 2007/0280453 | A1 | 12/2007 | Kelley et al. |
| 2007/0286100 | A1 * | 12/2007 | Saaranen ................ H04L 67/16 370/260 |
| 2007/0291761 | A1 * | 12/2007 | Kauniskangas ......... H04L 12/66 370/395.2 |
| 2008/0010301 | A1 | 1/2008 | Tian et al. |
| 2008/0232352 | A1 | 9/2008 | Terrill et al. |
| 2009/0077189 | A1 | 3/2009 | Requena |
| 2009/0132540 | A1 | 5/2009 | Hjelm et al. |
| 2010/0077038 | A1 | 3/2010 | Boberg et al. |
| 2010/0093284 | A1 * | 4/2010 | Terrero Diaz-Chiron ......... H04W 24/10 455/67.11 |

FOREIGN PATENT DOCUMENTS

| | | |
|---|---|---|
| CN | 1742475 | 3/2006 |
| CN | 1794652 | 6/2006 |
| EP | 1 549 013 | 6/2005 |
| JP | 2003-196243 | 7/2003 |
| JP | 2006-511863 | 4/2006 |
| JP | 2006-178965 | 7/2006 |
| KR | 1020020075800 | 10/2002 |
| KR | 1020050091010 | 9/2005 |
| KR | 1020060070419 | 6/2006 |
| WO | WO 2004/034719 | 4/2004 |
| WO | WO 2005/096592 | 10/2005 |
| WO | WO 2007/069992 | 12/2005 |
| WO | WO 2006/043792 | 4/2006 |

OTHER PUBLICATIONS

International Search Report PCT/KR2007/003898.
Written Opinion of Intnl Search Authority PCT/KR2007/003898.
Presence Simple Architecture Document, Approved Version 1.0, Open Mobile Alliance, Jul. 25, 2006.

* cited by examiner

740 {
```
1. SUBSCRIBE <sip:PresentityclientB.example.com>
    Via: SIP/2.0/TCP  PS.example.com:5060;branch=z9hG4bKxjfdsjfk
    To: <sip:presentity@example.com>;tag:12341111
    From: <sip:watcher@example.com>
    Call-ID: 32432udfidfjmk342
    Cseq: 1 SUBSCRIBE
     Expires: 3600
     Event: Presence
     Contact: <sip:watcher@example.com>
     Content-Type:
     application/Notification-Filter-rules+xml
     Content-Length: ...
     <?xml version="1.0" encoding="UTF-8"?>
     <Notification-Block-Set
   xmlns="urn:ietf:params:xml:ns:Notification-Filter-rules">
      <PresAttrib FID="567" Equals=" closed" >
           //dm:person/op:overriding-willingness/op:basic
      </PresAttrib>
     </Notification-Block-Set>
```

710 USER A → ← 720 PRESENCE SERVER → 730 USER B

750 {
```
2. NOTIFY sip:watcher@.example.com
    Via: SIP/2.0/TCP PS.example.com:5060;branch=z9hG4bKxjfder
    To: <sip:watcher@example.com>;tag:12341111
    From: <sip:presentity@example.com>;tag:232321
    Call-ID: 32432udfidfjmk342
    Cseq: 1 NOTIFY
    Event: Presence
    Subscription-State: active; CondOK
     expires=3599
     Contact: sip:presentity@example.com
     Content-Type: application/pidf+xml
     Content-Length: ...
```

FIG.7

SYSTEM AND METHOD FOR PRESENCE NOTIFICATION BASED ON PRESENCE ATTRIBUTE

PRIORITY

This application is a Continuation Application of U.S. patent application Ser. No. 12/377,822, filed at the United States Patent and Trademark Office on Sep. 29, 2010, which claims priority to Indian Patent Application No. 1442/CHE/2006, filed Aug. 14, 2006, Korean Patent Application No. 10-2007-0081530, filed Aug. 14, 2007, and International Application PCT/KR2007/003898, filed Aug. 14, 2007, the contents of which are incorporated herein by reference.

BACKGROUND OF THE INVENTION

1. Field of the Invention

The present invention, in general, relates to the field of networking and communication over networks. This invention is applicable to notification of presence information of user which is defined by OMA Presence and Availability working group. This invention is related to the SIP technologies. This innovation aims to optimize the presence notification. More particularly, this invention relates to a system and method for presence based presence notification for optimization of presence notification.

2. Description of the Related Art

The presence system architecture helps to share the presence information of any user to others. The presence information basically is the information related to user like current location of user, available contact information for user, application specific information like Instant message related, User is online in IM client or offline, POC specific attributes etc. Currently user needs to subscribe to the presence information of the required user, and then other user authorizes the user for seeing his presence information. The Presence Server entity maintains the presence subscription and stores the presence information of users. As soon as presence information of user changes, Presence Server sends the notification to the Watchers. The Watchers are basically users who are authorized to watch presence attributes of a user. Currently once user subscribes to presence information he will continuously receives the notification of presence information change. The SIP SUBSCIBE and SIP NOTIFY methods are used for the subscribing and notifying. There is huge notifications and publications traffic which is the primary concern for the network operators. As number of user increases load will be further increasing. As per current state of art, there are cases where unnecessary notification traffic flows through network entity and access network.

The current state of art supports the definition of filters for the presence information in a notification body. The notification body consists of various presence information of Presentity. There are number of presence attributes for a user, so Watcher may not be interested in all presence attributes. This is achieved by defining the filters in SUBSCRIBE body. User will define the filter rules in the subscription body which filter help in subscribing the required presence attributes. This filter rules are defined in the IETF draft Functional Description of Event Notification Filtering draft-ietf-simple-event-filter-funct-05⊚ This filtering rule also defines the rules for when to send the notification, by setting the particular condition for some presence attributes for e.g. status for Available presence attributes changes from Offline to Online then send the notification. These kind of filtering rules can be assigned in the body of subscribe request, so this filtering rules are use to set the content level.

The current state of art described above has the following limitations.

1. Currently notification is issued after each modification of presence attributes, notification traffic is very high.
2. Unnecessary notifications are not possible to block in current scenarios.
3. Currently user cannot control the notification based on there preferences.
4. Sometimes user uses multiple clients, user doesn't want to receive notifications on some client devices, this can not be achieved using current state.

Current filter mechanism defined by IETF basically is for content and notification rate controlling rules, but this innovation basically aims to block the notifications based on the presence attributes of the Watcher. These rules allow blocking unnecessary presence notifications when the user is busy or user is not willing to receive notification (based on device capability). This helps in controlling notification traffic and help user to set notification blocking filtering rules.

SUMMARY OF THE INVENTION

The present invention has been made to address at least the above problems and/or disadvantages and to provide at least the advantages described below. Accordingly, an aspect of the present invention provides a system and method for optimizing the presence notifications. The present invention aims to avoid the unnecessary notification thereby reducing the network load and annoying notifications for users. It proposes to set the notification based on the presence information of Watcher. This innovation provides system and method for setting the Watcher's presence based filtering rules for notification of presence information.

According to one aspect of the present invention, a presence server device is provided for providing a presence notification. The presence server device includes a transceiver that receives a request including a filtering rule from a watcher client device. The presence server device also includes a processor which controls to store a notification blocking filter corresponding to the filtering rule in a memory when the request has been authorized using authorization related information. The filtering rule is defined based on presence attributes of the watcher client device.

According to another aspect of the present invention, a method is provided for providing a presence notification. A presence server receives a request including a filtering rule from a watcher client. The filtering rule is defined based on presence attributes of the watcher client. The presence server stores a notification blocking filter corresponding to the filtering rule, when the request has been authorized using authorization related information.

According to an additional aspect of the present invention, a method is provided for receiving a presence notification. A request including a filtering rule is generated at a watcher client. The filtering rule is defined based on presence attributes of the watcher client. The request is sent to a presence server. The presence notification of another client is received from the presence server, when the request has been authorized using authorization related information and the presence notification has satisfied the filtering rule.

According to a further aspect of the present invention, a client device is provided for receiving a presence notification. The client device includes a processor that generates a request including a filtering rule. The client device also includes a transceiver that sends the request to a server device, and receives, from the server device, the presence notification of another client device, when the request has been authorized using authorization related information and the presence notification has satisfied the filtering rule. The filtering rule is defined based on presence attributes of the client device.

According to another aspect of the present invention, a presence server device is provided for providing a presence notification. The presence server device includes a transceiver that receives a request including a filtering rule from a watcher client device and receives the presence notification from another client device. The presence server device also includes a processor that determines whether the presence notification has passed a notification blocking filter corresponding to the filtering rule. The transceiver sends the presence notification to the watcher client device based on determining that the presence notification has passed the notification blocking filter. The filtering rule is defined based on presence attributes of the watcher client device.

Additionally, according to an aspect of the present invention, a method is provided for providing a presence notification. A request including a filtering rule is received at a presence server from a watcher client. The filtering rule is defined based on presence attributes of the watcher client. The presence notification is received from another client. It is determined whether the presence notification has passed a notification blocking filter corresponding to the filtering rule. The presence notification is sent to the watcher client based on determining that the presence notification has passed the notification blocking filter.

BRIEF DESCRIPTION OF THE DRAWINGS

The above and other aspects, features, and advantages of the present invention will be more apparent from the following detailed description when taken in conjunction with the accompanying drawings, in which:

FIGS. 6 and 7 are diagrams illustrating presence notification scenarios, according to an embodiment of the present invention.

DETAILED DESCRIPTION OF EMBODIMENTS OF THE PRESENT INVENTION

Figure 1:
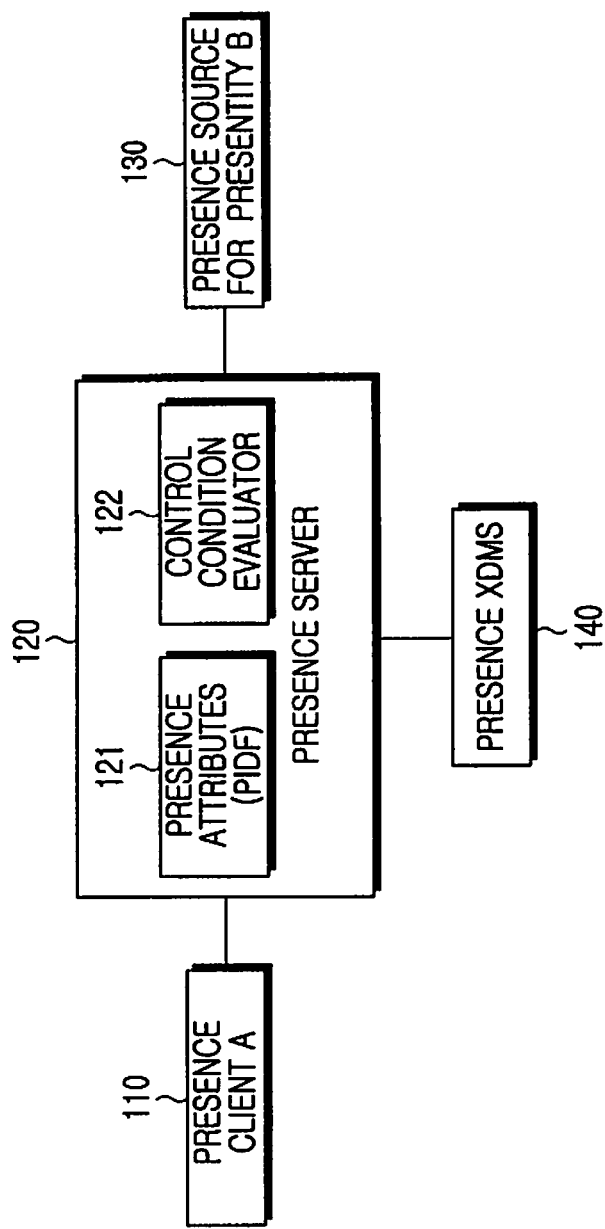
FIG. 1 is a diagram illustrating a system architecture, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Current presence system allows user to subscribe to presence information of other users. The Presence Server maintains the subscription information and presence information. Current presence system defined in OMA presence and availability group allows user to define the filter for controlling the amount of information sent in notification. Currently notification rate also can be controlled by time attribute. However, there are still a number of occasions where unwanted notifications are generated by Presence Server. There is very heavy load on the network traffic. This innovation aims to control these notifications.

This innovation aims to reduce the notifications based on the presence information of the Watcher. This innovation proposes to send the notifications based on the presence information of Watcher. This innovation allows the user to set the rules so that; based on these rules notifications will be sent or blocked. The simple example for this is, when Watcher is busy then don't send the notifications. There are a number of times when user is busy and he doesn't want to receive notifications, but he wish to keep the subscription. These are the situation where unwanted notifications are sent and increase the network load to deliver such unwanted notifications. This innovation proposes to have filter rules which block these unwanted notifications.

This innovation provides the system and method to enable the user to set the notification blocking filter based on his presence attributes.

The present invention has the following advantages:

i) The notification traffic can be reduced because unwanted notification can be blocked.

ii) The notification can be set using user preferences like his presence information.

iii) The user can set the time period for the notification.

iv) User can control the notification based on it device type also.

It will also be obvious to those skilled in the art that other control methods and apparatuses can be derived from the combinations of the various methods and apparatuses of the present invention as taught by the description and the accompanying drawings and these shall also be considered within the scope of the present invention. Further, description of such combinations and variations is therefore omitted above. It should also be noted that the host for storing the applications include but not limited to a microchip, microprocessor, handheld communication device, computer, rendering device or a multi function device.

Figure 2:
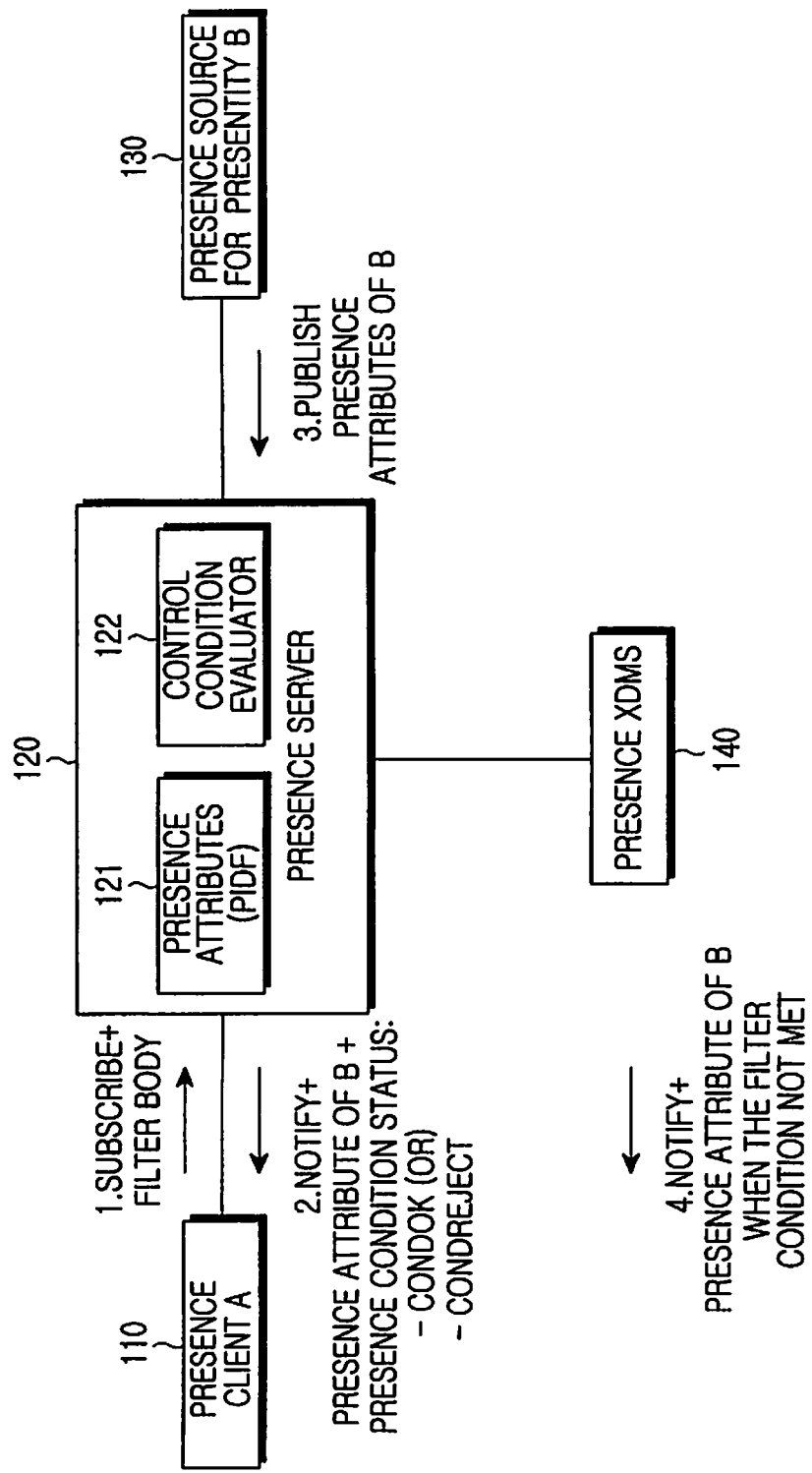
FIG. 2 is a diagram illustrating a logical flow, according to an embodiment of the present invention.

FIG. 1 shows the system architecture for the proposed innovations. This system architecture includes a Presence Server 120, which will store the presence subscription and presence information, and a Presence XML Document Management Server (XDMS) 140, which will store the authorization related information. In this innovation we propose that Presence Server 120 also store the filtering rule pertaining to presence based notification delivery. As shown in FIG. 2, in Presence Server 120, the Watcher's presence based notification blocking filter is stored, and then when notification is generated to the Watcher, it will be passed through the Watcher's presence based notification blocking filter, and then if this filter allows then only this notification will be sent to the Watcher. This innovation proposes the method for setting and applying these Watcher's presence based notification blocking filtering rules.

This invention proposes to have SUBSCRIBE request and includes the Watcher's presence based notification blocking filtering body in the SUBSCRIBE request. In this innovation we propose the structure of the Watcher's presence based notification blocking filter and its operational flows and processings.

Hereinafter, the flow and operation signal flow for single domain and multi domain case are described.

FIG. 2 shows the general steps followed in this innovation for setting these filter rules. Client 110 first constructs the SUBSCRIBE request with the Watcher's presence based notification blocking filter body within it. This filter body will have the detailed conditions to be checked before sending the notifications, e.g. if my presence state is BUSY then don't send the notifications. This filter body is in XML format. Presence Server 120 receives the SUBSCRIBE request from client 110 and then evaluate the condition. If Presence Server 120 understands and is able to handle these conditions then Presence Server sends 200 OK response and the subsequent notification with subscription state header value as "CondOK" ⊙ and body with presence attributes. So the requested notification blocking filtering rules will be stored into the Presence Server 120 and every time when notification is generated these conditions are checked.

Figure 3:
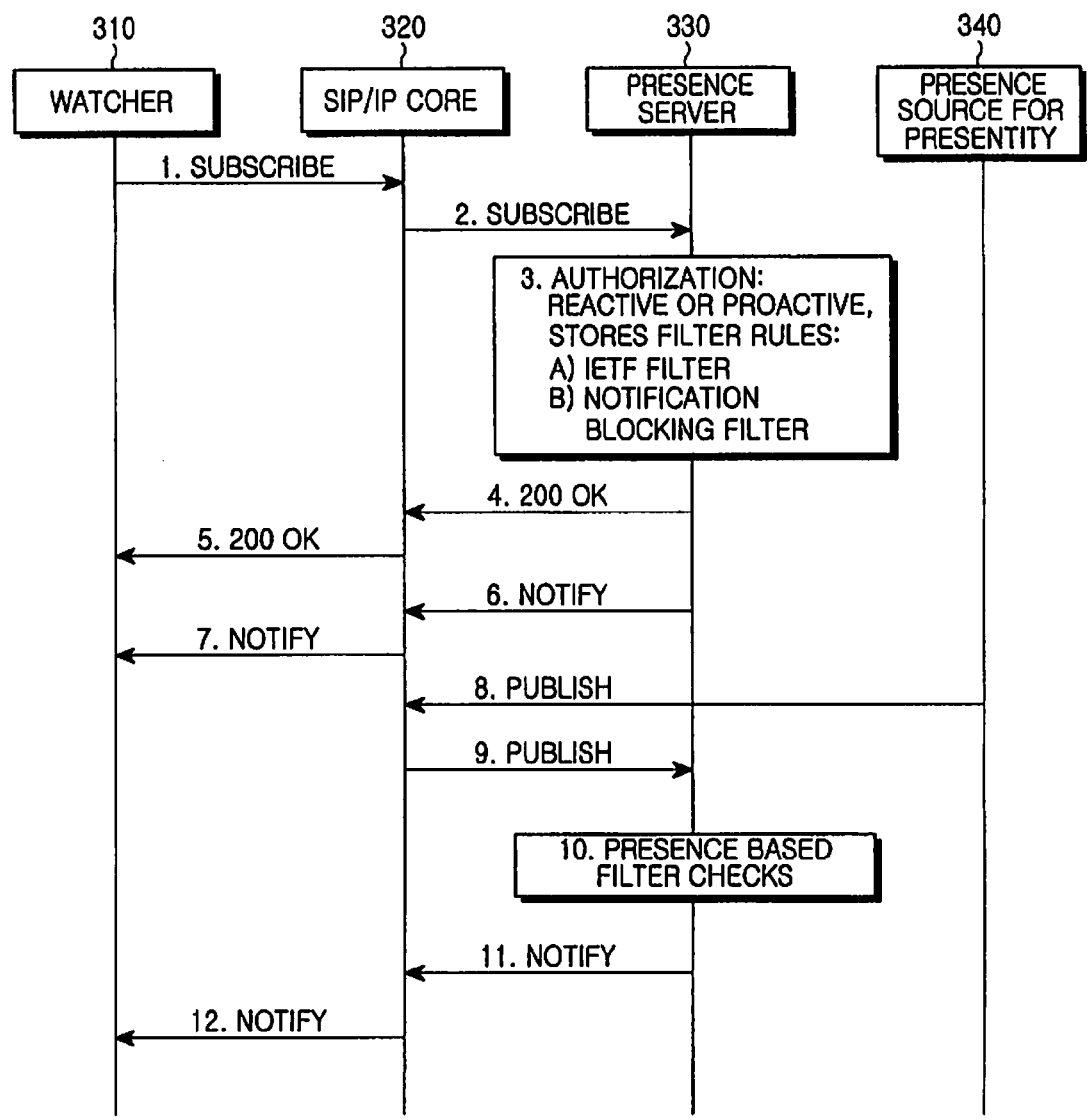
FIG. 3 is a diagram illustrating watcher and presence in single domain, according to an embodiment of the present invention.

FIG. 3 shows flow diagram for the single domain, where Watcher and Presentity are in same domain. The detail flows are as follows:

1. Watcher 310 sends the SUBSCRIBE request with filters for the notification blocking in body of subscribe request.
2. SIP core 320 forwards the request to the Presence Server.
3. Presence Server 330 receives the request, check the authorization, and check the filter body structure. If the found filter body is valid, the Presence Server 330 then stores the filter, and sends the positive response. If authorization is not allowed, the Presence Server 330 sends the negative response as per SIP SUBSCRIBE/NOTIFY behavior. The Presence Server 330 also includes the "CondOK" ⊙ in the response if notification blocking filter is allowed, or send "CondReject" if notification block filter is not allowed then terminate the subscription. Alternatively, Presence Server 330 can only invalidate the requested notification blocking filtering rules while accepting the requested subscription.
4. Presence Server 330 sends the 200 OK response through SIP Core 320.
5. SIP core 330 forwards the response to Watcher device 310.
6. Presence Server 330 sends the initial notify response with proper Status as "CondOk" or "CondReject" to indicate whether the requested notification blocking filters has been accepted or rejected.
7. SIP core 320 forwards the notify response to Watcher 310.
8. Presence Source 340 that represents the Presentity identifies the changes on the presence information of the Presentity, and PUBLISHES the updated presence information to Presence Server 330.
9. Presence Server 330 generates the notification and then checks the notification blocking filter rules
10. If notification blocking rules allow to send the notification then the Presence Server 330 sends the notification to the Watcher 310.
11. SIP core 320 forwards the notification request to the Watcher 310.

By this way, defining the presence notification blocking filter and storing it into the Presence Server 330, allows avoiding the unnecessary notification flows through the network. This also helps in avoiding such presence notification flowing through access network, and this will be very beneficial for wireless environment.

Figure 4:
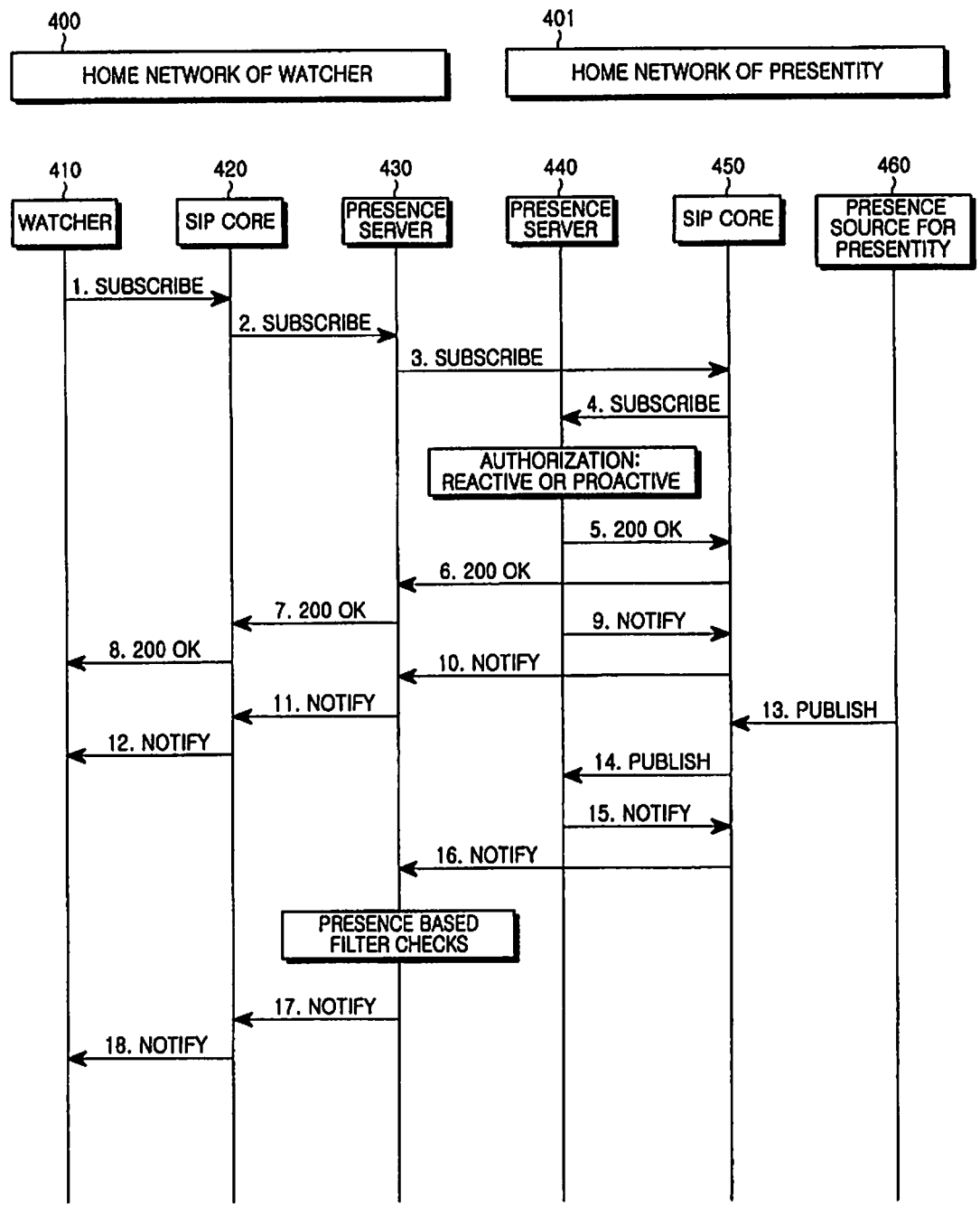
FIG. 4 is a diagram illustrating a multi-domain subscribe scenario, according to an embodiment of the present invention.

FIG. 4 shows multi-domain case. Here client sends the subscribe request and include the Route header field and assigns value as home Presence Server 430.

1. Watcher 410 sends the SUBSCRIBE request with filter body for presence based filtering and also adds the Route header field with his home Presence Server address.
2. SIP core 450 forwards the request to the Watcher's home Presence Server.
3. Watcher's home Presence Server 430 extracts the filters related to presence, set the filters, and adds the record route header and adds its address and forwards the request to SIP core 450 of Presentity network.
4. SIP core 420 forwards the subscribe request to the Presence Server 440 of Presentity.
5. Presentity's Presence Server 440 checks the authorization policy and if Watcher is authorized. Presence Server 440 will store the filter related to content of presence document and send the 200 OK response.
6. SIP core 450 of Presentity forwards the 200 OK response to Watcher's Presence Server 430.
7-8. Presence Server 430 forwards the 200 OK response via SIP core 450.
9-10. Presence Server 440 sends the first initial notification to Watcher 410 though SIP core 420. This will be routed through Presence Server 430 of Watcher, just like the above 200 OK response.
11-12 Presence Server 430 of Watcher receives the first notification and then and the appropriate status information and forward it to Watcher 410 via SIP Core 420.
13. Presence Source 460 of Presentity sends the PUBLISH request for updating its presence information to Presence Server 440 of Presentity through SIP core 450.
14. SIP core 450 forwards this request to Presence Server 440 of Presentity.
15. Presence Server 440 of Presentity updates the presence document of Presentity, and checks the filter related to content of presence document and sends the notification towards Presence Server 430 of Watcher by adding it in the Route header.
16. SIP core 450 forwards this notification to the Presence Server 430 of Watcher.
17-18. Presence Server 430 of Watcher checks the notification and check the Watcher's presence related filter and if filter allows then forward the notification to Watcher 410 through SIP Core 420.

This way defining the presence filters and storing those into the Presence Server, allows avoiding the unnecessary notifications flowing through network. This also helps in avoiding such presence notification flowing through access network, and this will be very beneficial for wireless environment.

Figure 5:
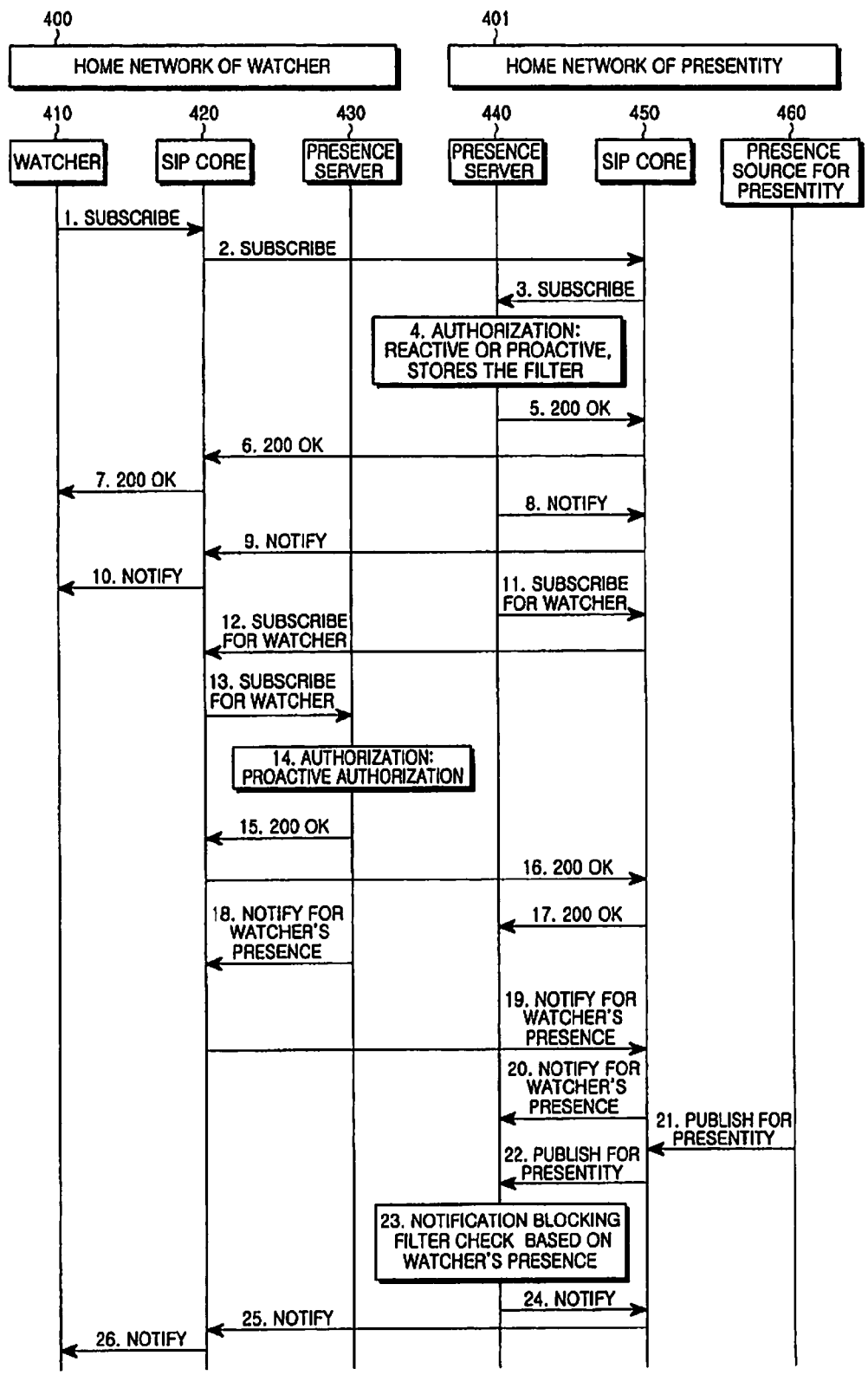
FIG. 5 is a diagram illustrating a presence server subscribing for the presence information of the Watcher and then storing the notification block filter rule in the presence server, according to an embodiment of the present invention.

FIG. 5 shows the alternate solution where Presence Server of Presentity will subscribe for the presence information of the Watcher and then store the Watcher's presence based notification block filter rule in the Presence Server of Presentity. So Presentity's Presence Server will block the notifications based on Watcher's presence information.

1-3. Watcher 410 sends SUBCRIBE request with filter rules in body this will route to Presence Server 440 of Presentity.
4. Presence Server 440 of Presentity checks for authorization, and then sets the filter rules and stores the filter rules.
5-7. Presence Server 440 of Presentity sends the 200 OK response towards Watcher 410 through SIP Core 450, 420.
8-10. Presence Server 440 of Presentity sends the initial notification of the Presentity's presence information towards Watcher 410 through SIP Core 450, 420.
11-13. Presence Server 440 of Presentity subscribes for the required Watcher's presence information to Presence Server 430 of Watcher.

14-20. Presence Server 430 of Watcher proactively authorizes Presence Server, and then sends the 200 ok response and subsequently the notification of Watcher's presence attributes towards Presence Server 440 of Presentity.

21-22. When Presentity's presence information changes, Presence Source 440 for Presentity will send the PUBLISH request to update the presence information in Presence Server 440 of Presentity.

23. Presence Server 440 will check the notification blocking rules as well as content filtering rules and decides whether to send the notification or not.

24-26. Presence Server 440 of Presentity will send the notification of Presentity's presence information to Watcher, after checking filter rules.

Hereinafter, Watcher's Presence based Notification Blocking Filter Body Structure will be described.

This innovation proposes to have the following XML schema for setting the filtering rules. This schema proposes to have the one root element called "Notification-Block-set." In this, we have two elements, one of which is "PresAttrib," and the other of which is "TimeAttrib." The PresAtrrib is used for setting presence related conditions, and TimeAttrib is used for setting time based control on the notifications. PresAttrib consist of following attributes, i. Equals: Presence attribute equal to what then to block the conditions ii. Type: type of Values, whether XPATH or URI etc.

iii. FID: Filter ID to differentiate the different filter iv. ValidTime: time period for condition is valid v. OperationType: Operation performed on the filtering rules like adding more filters, removing filtering rules Operations Performed in Relation to the Rules PresAttrib will have the value as presence attribute in XPATH or URI format, so Presence Server will check if presence attribute is equal to Equals attribute value (which is compulsory value) if it finds a match then it will block the notifications. ValidTime attribute is used to give the valid time period for this condition. The TimeAttrib is used for setting the time based blocking of the notifications, like block notification FROM to TO values. Note in PresFilter we can have number of PresAttrib mean one or more condition can be set. The one or two PresAttb present then logical OR is done, same for the TimeAttrib.

The following Table 1 shows the schema definition for the above described structure of Watcher's Presence based Notification Blocking Filter.

TABLE 1

```
<?xml version="1.0" encoding="UTF-8"?>
    <xs:schema                                  xmlns="urn:Notification-Filter-rules"
xmlns:xs="http://www.w3.org/2001/XMLSchema" targetNamespace="urn:Notification-
Filter-rules" elementFormDefault="qualified" attributeFormDefault="unqualified">
        <xs:import      namespace="http://www.w3.org/XML/1998/namespace"
schemaLocation="http://www.w3.org/2001/xml.xsd"/>
            <xs:annotation>
                <xs:documentation xml:lang="en">
            XML Schema Definition for Filter Criteria.
        </xs:documentation>
        </xs:annotation>
        <!-- <xs:element name="filter-set" type="FilterSetType"/> -->
        <!-- Defination of attributes Elements -->
        <xs:attribute name="Equals" type="xs:string"/>
        <xs:attribute name="ValidTime" type="xs:time"/>
        <xs:attribute name="FID" type="xs:string"/>
        <xs:attribute name="Type">
            <xs:simpleType>
                <xs:restriction base="xs:string">
                    <xs:enumeration value="XPATH"/>
                    <xs:enumeration value="URI"/>
                </xs:restriction>
            </xs:simpleType>
        </xs:attribute>
        <xs:attribute name="OperationType">
            <xs:simpleType>
                <xs:restriction base="xs:string">
                    <xs:enumeration value="ADD"/>
                    <xs:enumeration value="REMOVE"/>
                </xs:restriction>
            </xs:simpleType>
        </xs:attribute>
        <!-- Defination of Simple Elements-->
        <xs:attribute name="From" type="xs:time"/>
        <xs:attribute name="To" type="xs:time"/>
        <xs:attribute name="FiltID" type="xs:string"/>
        <!-- Defination of Complex Elements-->
        <xs:complexType name="PresenceCond">
            <xs:simpleContent>
                <xs:extension base="xs:string">
                    <xs:attribute ref="Equals" use="required"/>
                    <xs:attribute ref="ValidTime" use="optional"/>
                    <xs:attribute ref="FID" use="required"/>
                    <xs:attribute    ref="Type"     use="optional"
default="XPATH"/>
                    <xs:attribute ref="OperationType" use="optional"
default="ADD"/>
                    <xs:anyAttribute        namespace="##other"
processContents="lax"/>
                </xs:extension>
```

TABLE 1-continued

```
            </xs:simpleContent>
        </xs:complexType>
        <xs:complexType name="TimeAttribType">
            <xs:simpleContent>
                <xs:extension base="xs:boolean">
                    <xs:attribute name="From" type="xs:time" use="required"/>
                    <xs:attribute name="TO" type="xs:time" use="required"/>
                    <xs:anyAttribute namespace="##other" processContents="lax"/>
                </xs:extension>
            </xs:simpleContent>
        </xs:complexType>
        <!-- Defination of Presence Filter Elements-->
        <xs:element name="Notification-Block-Set">
            <xs:complexType>
                <xs:sequence>
                    <xs:element name="PresAttrib" type="PresenceCond" maxOccurs="unbounded"/>
                    <xs:element name="TimeAttrib" type="TimeAttribType" minOccurs="0"/>
                </xs:sequence>
            </xs:complexType>
        </xs:element>
    </xs:schema>
```

The following Table 2 shows the example of Watcher's Presence based Notification Blocking Filter that conforms to the schema definition in the above Table 1.

TABLE 2

```
<?xml version="1.0" encoding="UTF-8"?>
<Notification-Block-Set xmlns=
"urn:ietf:params:xml:ns:Notification-Filter-rules">
    <!-- Condition1: Notificaiton will be blocked when the
    Watcher is 'away'-->
    <PresAttrib FID="123" Equals="away">
        //dm:person/rpid:activities/rpid:away
    </PresAttrib>
    <!-- Condition2: Notificaiton will be blocked when the Watcher
is not willing to communicate -->
    <PresAttrib FID="567" Equals="closed">
            //dm:person/op:overriding-willingness/op:basic
    </PresAttrib>
    <!-- Condition3: Notificaiton will be blocked for the specified
    duration -->
    <TimeAttrib FROM="6:00:00"
    TO="7:00:00">TRUE</TimeAttrib>
```

As discussed in previous section, definition of various elements and attributes for notification blocking filter rules schema. This section explains the processing rules for the xml document format.

First, client side schema processing is discussed.

Client will use this schema for defining the presence based notification blocking filtering rules in SUBSCRIBE body. As per definition of schema, Client will include the presence filter rules using the element "PresAttrib" in root element "Notification-Block-set." Client assigns the value to PresAttrib as presence attribute name using XPATH notation or using other type with "Type" attribute mentioning the format used and assigns the value of presence attribute in Equals attribute. If "Type" attribute is missing then XPATH will be consider as default type. Client shall assign the unique filter ID value to rule using FID attribute. Note client can include the one or more PresAttrib in the document for including the multiple conditions, and these conditions will have different "FID" value. The PresAttrib also has attribute OperationType which will tell the type of operation like "ADD" or "REMOVE." The PresAttrib with Remove OperationType value is use to remove the filter rules. If REMOVE is used plus some value mentioned in the value of PresAttrib element then replace operation need to be performed by server. By default the ADD value will be considered if OperationType is not included in document. Suppose user want to define the logical AND operation for some conditions, then client will add the two "PresAttrib" and assigns the same FID attribute value to both PresAtrrib.

Client can also define the time based filter rule using the "TimeAttrib" element. Client use the TimeAttrib and assigns the FROM and TO time attribute values accordingly as per required time duration.

Next, the server side schema processing is discussed. When presence based notification blocking filter body is received in the SUBSCRIBE request, server will check the validity of document using schema definition. Server will generate error when filter is not valid. After validation, server will read the notification blocking filter rules constituted by the presence attributes in "PresAttrib" element and time attributes in "TimeAttrib" element from the body, and stores the filter rules. Server also checks for the validity period to this rule if mentioned and assigns FID to rule assigned by client.

If multiple "PresAttrib" elements and "TimeAttrib" elements are present the server will logically OR all these conditions. When Server identifies two conditions with same FID then Logical AND operation will be performed for those two conditions. If server receives the empty "PresAttrib" element or "TimeAttrib" element with FID and OperationType as "REMOVE" then the particular existing filter rules that has the same FID are deleted from the server. If server receives the non empty PresAtrrib with FID and OperationType as "REPLACE" then the particular existing filter rules that has the same FID will be replaced by the mentioned rule.

Hereinafter, behavior of the presence server is described.

A Watcher who wants to receive the notifications on the presence information of Presentity but only during the specific Watcher's presence conditions generates SUBSCRIBE request with presence notification blocking filter rules that specify such Watcher's presence conditions. The Watcher can specify in the filter body as described in the above section 3 his preferred presence conditions to receive the notifications, and include the filter body in the SUBSCRIBE request for the Presentity's presence information. When included in the SUBSCRIBE request, the content type for this filter can be specified as "simple-filter-presfilter+xml."

Hereinafter, Presence Server Behavior is described.

First, extraction of Watcher's presence based notification blocking filter is discussed.

The new content type for the Watcher's presence based notification blocking filter as proposed by this invention can be "simple-filter-presfilter+xml." When included in the body of the SUBSCRIBE request, this content type is used for Presence Server to identify the existence of the Watcher's presence related notification blocking filter. When identified, Presence Server extracts the notification blocking filter from the SUBSCRIBE body and stores it for further processing.

Next, Processing of the extracted Watcher's presence based notification blocking filter is discussed.

Presence Server processes the extracted Watcher's presence based notification blocking filter as described in the above section 3 with following clarifications:

If Presence Server understands and is able to handle these conditions as specified in the Watcher's presence related notification blocking filter, then Presence Server sends 200 OK response and the subsequent NOTIFY with subscription state header value as "active" and "CondOK" and the body with the requested presence attributes of the target Presentity.

Upon this successful subscription with the Watcher's presence related notification blocking filter, the Presence Server stores the filtering rules to be applied for future generation of NOTIFY requests to Watcher. When generating the NOTIFY requests that contain the Presentity's presence attributes as requested by the Watcher, the Presence Server checks the conditions in the Watcher's presence based notification blocking filters. If the conditions match with the current Watcher's presence attributes as the Presence Server is aware of, then the Presence Server refrains from sending the NOTIFY requests to Watchers, otherwise, the Presence Server sends the NOTIFY requests to Watcher. FIG. 3 shows the example flows per these procedures.

If Presence Server identifies the Watcher's presence based notification blocking filters but it cannot evaluate the specified conditions in the filters then the Presence Server will send 200 OK or 202 Accepted response and the subsequent NOTIFY requests with subscription state header value as "terminated" and "CondReject," which tells the Watcher that the requested conditions in the Watcher's presence based notification blocking filter is not able to be evaluated, and then will terminate the subscription.

Alternatively, if Presence Server wishes to maintain the subscription even if Presence Server does not understand the notification blocking filtering rules, then the Presence Server maintains the subscription by sending 200 OK or 202 Accepted response, and in the subsequent NOTIFY requests sets subscription state header value to "active" and "CondReject" while keeping the subscription. So when the Watcher receives the NOTIFY request with subscription state as "active" and "CondReject," then the client can recognize that the requested notification blocking filtering rules are rejected or not understood by Presence Server but the requested subscription is still valid and thus can receive future notifications on the requested presence attributes of the target Presentity.

If Presence Server does not support the notification blocking filtering rules, then Presence Server will send the 403 Forbidden response or other appropriate error response to the SUBSCRIBE request. This may be depends on the local policy of the Presence Server.

Next, a multiple domain case is discussed.

In case the Watcher resides in different domain than that of the target Presentity, the SUBSCRIBE request with the Watcher's presence based notification blocking filtering rules should be routed to the Watcher's Presence Server then be forwarded to the Presentity's Presence Server, as exemplified in FIG. 4 and the steps in the above section 1b. In this case, the Watcher's Presence Server handles the Watcher's presence based notification blocking filtering rules as described above, and upon successful handling of the Watcher's presence based notification blocking filtering rules, forwards the SUBSCRIBE request to Presentity's Presence Server for further processing of the subscription to the Presentity's presence information and, if exists, the Watcher's event notification filter as per RFC 4660 "Functional Description of Notification Filtering." Upon receiving the NOTIFY requests on the Presentity's presence information from the Presentity's Presence Server, the Watcher's Presence Server checks whether the Watcher's presence based notification blocking filtering rules match the current Watcher's presence attributes. If matches, the Watcher's Presence Server blocks to forward the received NOTIFY requests to the Watcher, otherwise forwards the NOTIFY requests, just as specified in the above.

In the above multiple domain, the SUBCRIBE request should be routed to the Watcher's Presence Server for processing and storage of the Watcher's presence related notification blocking filter rules. However, currently, the SUBSCRIBE request can only be routed directly to the Presentity's Presence Server through SIP core. As such, there requires to mandate the Watcher's Presence Server in the SUBSCRIBE SIP session path. This can be achieved by using the SIP Route header with SIP address of the Watcher's Presence Server or its home Presence Server. Therefore, in this case of the multi domain the home Presence Server or the Presence Server for Watcher will act as a relay server that forwards the notifications from the Presentity's Presence Server and act as the point where the notifications to Watcher are to be controlled per the Watcher's presence based notification blocking filtering rules.

Next, another Multiple domain case is discussed.

Alternatively, in case the Watcher resides in different domain than that of the target Presentity, the SUBSCRIBE request with the Watcher's presence based notification blocking filtering rules should be routed directly to the Presentity's Presence Server. Then, the Presentity's Presence Server handles the subscription requests and, if exists, the Watcher's event notification filter as per RFC 4660 "Functional Description of Notification Filtering." Upon identifying the existence of the Watcher's presence based notification blocking filtering rules, the Presentity's Presence Server handles these as described in the above and then sends the SUBSCRIBE request to the Watcher's Presence Server for the subscription to the Watcher's presence information to have the Watcher's up-to-date presence information. Upon generating the NOTIFY requests on the Presentity's presence information, the Presentity's Presence Server checks whether the Watcher's presence based notification blocking filtering rules match the current Watcher's presence attributes. If matches, the Presentity's Presence Server refrains from sending the NOTIFY requests to the Watcher, otherwise sends the NOTIFY requests to the Watcher. The FIG. 5 shows the example flows per these procedures.

Hereinafter, Alternative Structure and Processing of Watcher's Presence based Notification Blocking Filter Body will be described.

In addition to the Watcher's Presence based Notification Blocking Filter Body structure as described in section 2, this invention proposes the following alternative structure. The following Table 3 shows the schema definition for this alternative structure.

TABLE 3

```xml
<?xml version="1.0" encoding="UTF-8"?>
<xs:schema xmlns="urn:Notification-Filter-rules" xmlns:xs="http://www.w3.org/2001/XMLSchema" targetNamespace="urn:Notification-Filter-rules" elementFormDefault="qualified">
    <xs:import namespace="http://www.w3.org/XML/1998/namespace" schemaLocation="http://www.w3.org/2001/xml.xsd"/>
    <xs:annotation>
        <xs:documentation xml:lang="en">Schema Definition for Notification Block Filter Criteria.
        </xs:documentation>
    </xs:annotation>
    <xs:element name="notblock-filter-set" type="NOTblockFilterSetType"/>
    <xs:complexType name="NOTblockFilterSetType">
        <xs:sequence>
            <xs:element name="ns-bindings" type="NSBindings" minOccurs="0"/>
            <xs:element name="notblock-filter" type="NOTblockFilterType" maxOccurs="unbounded"/>
        </xs:sequence>
        <xs:attribute name="watcher-uri" type="xs:anyURI" use="optional"/>
        <xs:anyAttribute namespace="##other" processContents="lax"/>
    </xs:complexType>
    <xs:complexType name="NSBindings">
        <xs:sequence>
            <xs:element name="ns-binding" type="NSBinding" maxOccurs="unbounded"/>
        </xs:sequence>
    </xs:complexType>
    <xs:complexType name="NSBinding">
        <xs:attribute name="prefix" type="xs:string" use="required"/>
        <xs:attribute name="urn" type="xs:anyURI" use="required"/>
    </xs:complexType>
    <xs:complexType name="NOTblockFilterType">
        <xs:sequence>
            <xs:element name="presattrib" type="presattribType" minOccurs="0" maxOccurs="unbounded"/>
            <xs:element name="timeattrib" type="timeattribType" minOccurs="0" maxOccurs="unbounded"/>
            <xs:any namespace="##other" processContents="lax" minOccurs="0" maxOccurs="unbounded"/>
        </xs:sequence>
        <xs:attribute name="id" type="xs:string" use="required"/>
        <xs:attribute name="remove" type="xs:boolean" use="optional" default="false"/>
        <xs:attribute name="enabled" type="xs:boolean" use="optional" default="true"/>
        <xs:attribute name="valid-till" type="xs:dateTime" use="optional"/>
        <xs:anyAttribute namespace="##other" processContents="lax"/>
    </xs:complexType>
    <xs:complexType name="presattribType">
        <xs:sequence>
            <xs:element name="include" type="InclType" minOccurs="0" maxOccurs="unbounded"/>
            <xs:any namespace="##other" processContents="lax" minOccurs="0" maxOccurs="unbounded"/>
        </xs:sequence>
    </xs:complexType>
    <xs:complexType name="InclType">
        <xs:simpleContent>
            <xs:extension base="xs:string">
                <xs:attribute name="type" type="TypeType" use="optional" default="xpath"/>
                <xs:anyAttribute namespace="##other" processContents="lax"/>
            </xs:extension>
        </xs:simpleContent>
    </xs:complexType>
    <xs:simpleType name="TypeType">
        <xs:restriction base="xs:string">
            <xs:enumeration value="xpath"/>
            <xs:enumeration value="namespace"/>
        </xs:restriction>
    </xs:simpleType>
    <xs:complexType name="timeattribType">
        <xs:sequence>
            <xs:element name="duration-date" type="duration-dateType" minOccurs="0" maxOccurs="unbounded"/>
```

TABLE 3-continued

```
            <xs:element name="duration-time" type="duration-timeType" minOccurs="0" maxOccurs="unbounded"/>
            <xs:any namespace="##other" processContents="lax" minOccurs="0" maxOccurs="unbounded"/>
        </xs:sequence>
    </xs:complexType>
    <xs:complexType name="duration-dateType">
        <xs:attribute name="from" type="xs:dateTime" use="optional"/>
        <xs:attribute name="till" type="xs:dateTime" use="optional"/>
        <xs:anyAttribute namespace="##other" processContents="lax"/>
    </xs:complexType>
    <xs:complexType name="duration-timeType">
        <xs:attribute name="from" type="xs:time" use="optional"/>
        <xs:attribute name="till" type="xs:time" use="optional"/>
        <xs:anyAttribute namespace="##other" processContents="lax"/>
    </xs:complexType>
</xs:schema>
```

Table 3 shows alternate schema for Watcher's presence based notification blocking filtering rules as proposed by this invention, which is basically based on RFC 4661 "XML Based Format for Event Notification Filtering" and appropriate enhancement to support the notification blocking filtering rules based on Watcher's Presence. This section briefly explains the schema structure.

This schema defines root element called "notblock-filter-set." Root element has following elements:

ns-bindings: to specify the binding between namespace and prefix;

notblock-filter: to specify the filter rules.

The "notblock-filter-set" root element also has one attribute called "watcher-uri," which is used to specify the target Watcher URI based on whose presence attribute the notification blocking filtering rules are to be applied.

A "notblock-filter" element is used to specify the filtering rules. This element has following attributes:

i) id: This attribute is used to identify the filter rule.

ii) remove: This attribute is used to remove filtering rule. Its value is boolean (true/false).

iii) enable: This attribute is used to enable/disable the filtering rule. Its value is boolean (true/false).

iv) valid-till: This attribute is used to specify the validity of time and date for particular filter rule. Its value is date and time.

A "notblock-filter" element can have two child elements, i) presattrib, which helps to define the filtering rule for particular presence information for which the notification gets blocked, and ii) timeattrib, which helps to identify time period for blocking the notifications. "presattrib" has "include" element. A "include" has one attribute "type" to specify the type of the value of "include" element. The value of "type" attribute can be 'xpath' or something else, where 'xpath' is the default value in case of the absence of "type" attribute. We can use the XPATH Boolean operators for specifying the particular condition on presence attribute (See example table 5). We include more than one include element to specify the multiple condition. Multiple conditions will be logically ANDed. Presence conditions specified in different notblock-filter element will be logically ORed.

A "timeattrib" child element of "notblock-filter" element will be used to specify the time period for blocking the notification. This element has two elements i) duration-time ii) duration-date. The "duration-time" and "duration-date" element has two attributes, one "from" and the other "till," which are used to specify the time and date duration, respectively (See example table 4). During this period all notifications will be blocked.

The following Table 4 shows the example of Watcher's Presence based Notification Blocking Filter that conforms to the alternative schema definition as in the above Table 3.

TABLE 4

```
<?xml version="1.0" encoding="UTF-8"?>
<notblock-filter-set xmlns="urn:Notification-Filter-rules"
watcher-uri="target_watcher@example.com">
<ns-bindings>
<ns-binding prefix="dm" urn="urn:ietf:params:xml:ns:pidf:data-model"/>
  <ns-binding prefix="rpid" urn="urn:ietf:params:xml:ns:pidf:rpid"/>
</ns-bindings>
<!-- The notification will be blocked if one of the following Conditions get match -->
    <!-- Condition1: Notificaiton will be blocked when the Watcher is 'away' and 'meeting'-->
        <notblock-filter id="123">
        <presattrib>
        <include>//dm:person/rpid:activities/rpid:away</include>
        <include>//dm:person/rpid:activities/rpid:meeting</include>
        </presattrib>
        </notblock-filter>
        <!-- Condition2: Notificaiton will be blocked when the Watcher is not willing to communicate -->
        <notblock-filter id="567">
        <presattrib>
        <include>//dm:person/op:overriding-willingness[op:basic="closed"]</include>
        </presattrib>
        </notblock-filter>
```

TABLE 4-continued

```
<!-- Condition3: Notificaiton will be blocked for the specified duration -->
<notblock-filter id="abc">
<timeattrib>
<duration-time from="18:00:00" till="00:00:00"/>
<duration-time from="00:00:00" till="08:00:00"/>
</timeattrib>
</notblock-filter>
</notblock-filter-set>
```

In addition to the section 3, the Watcher's Presence based Notification Blocking Filter Body conforming to the above schema definition in Table 3 will be processed as following:

First, the client side processing is discussed.

Client will use the above described schema for defining the presence based notification blocking filtering rules in SUBSCRIBE body. As per definition of schema, Client can specify under each "notblock-filter" element the notification blocking rules when it wishes not to receive notifications. When multiple notification blocking rules specified, the notification will be blocked when one of the notification blocking rule specified within a "notblock-filter" element matches. That is, the evaluation of the notification blocking filtering rules within each "notblock-filter" element under "notblock-filter-set" root element is logical OR.

In a notification blocking rule within a "notblock-filter" element, Client can specify multiple conditions using either "presattrib" or "timeattrib" child element. The evaluation of those is logical AND. i.e., a notification blocking rule in a "notblock-filter" element matches only when all conditions in the rule are evaluated TRUE.

In each "notblock-filter" element that constitutes one notification blocking filtering rule, Client can use "presattrib" element to specify the presence attributes for the notification blocking. Those presence attributes can be expressed in the format of XPATH. Client can also use "timeattrib" element to specify the time duration during which the notification will get blocked. The "timeattrib" element can have two types of child elements: "duration-time" child element is used to specify the every day time duration for notification blocking, while "duration-date" child element is used to specify the exact date and time duration for notification blocking.

Client can identify a notification blocking filtering rule in a "notblock-filter" element by using the value of "id" attribute of "notblock-filter" element. Client cans enable/disable a notification blocking filtering rule by using the value of "enable" attribute of "notblock-filter" element. Client can remove a notification blocking filtering rule by using the "remove" attribute of "notblock-filter" element. Client can set a valid time duration of notification blocking filtering rule by setting "valid-till" attribute of "notblock-filter" element.

Next, the server side processing is done as follows.

When receiving the Client's request on the presence based notification blocking filter body in the SUBSCRIBE request, server will check the validity of document using the above schema definition. Server will generate error when filter is not valid. After validation, server will extract the notification blocking filter rules from the SUBSCRIBE body, and stores those.

When evaluating the notification blocking filtering rule specified in a "notblock-filter" element, the server checks whether the presence attributes of the target as specified by "watcher-uri" attribute of "notblock-filter-set" root element matches with the presence conditions in "presattrib" elements. Also, the server checks whether the current time is within the time duration conditions specified in "timeattrib" elements. If all the presence and time conditions match, the notification blocking filtering rule is evaluated TRUE.

When one or more than one notification blocking rules in the "notblock-filter-set" element becomes evaluated TRUE, then the server will block the notifications. Server will ignore and will not evaluate the notification blocking rule in "notblock-filter" element if one of the following conditions matches:

The value of "enable" attribute of the "notblock-filter" element is set to FALSE; or The time specified "valid-till" attribute of the "notblock-filter" element has been expired.

When server receives a notification blocking rule in the "notblock-filter" element with the "id" attribute and the "remove" attribute set to TRUE, the server will remove the server-storing notification blocking rule that has the same "id" attribute value.

Hereinafter, a presence attribute based presence notification method according to the present invention will be described.

Figure 6:
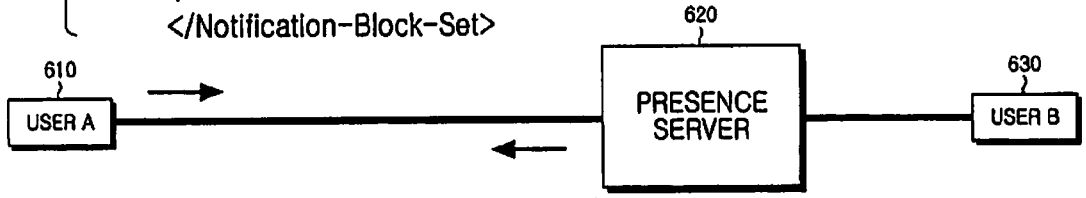

The following section gives the examples flows shown in FIG. 6 and FIG. 7.

First, a case where a user set filter when he is Away is discussed.

In this example as shown in FIG. 6, User A sets the filter rule as: when he is 'away' then don't sent the notifications. For this, User A will construct the SUBSCRIBE request and include the notification blocking filter rules as a body as per the schema defined in this innovation. In this example User A will set PreseAttrib equal to 'away' RPID element, RFC 4480 "Rich Presence Extensions to the Presence Information Data Format (PIDF)" of PIDF document, so server will not send the notification if the User A's RPID presence attribute is 'away' (640). After receiving the request server will analyze the request and then send the notification with CondOK in Subscription-State header element. In this way, this method uses to set the notification blocking filtering rules (650).

Next, a case in which the client is not willing to communicate is discussed.

In this example as shown in FIG. 7, User A sets the filter rule as: when he is not willing to communicate then don't sent the notifications. For this, User A will construct the SUBSCRIBE request and include the notification blocking filter rules as a body as per the schema defined in this innovation. In this example, User A will set PreseAttrib equal to "overriding-willingness" element of PIDF document and "Equals" attribute to "closed," so server will not send the notification if the User A's "overriding-willingness" presence attribute is "closed" (740). After receiving the request server will analyze the request and then send the notification with CondOK in Subscription-State header element. Thus this way this method uses to set the filtering rules (750).

While the invention has been shown and described with reference to certain embodiments thereof, it will be understood by those skilled in the art that various changes in form and detail may be made therein without departing from the spirit and scope of the invention as defined by the appended claims.

What is claimed is:

1. A presence server device for providing a presence notification, comprising:
   a transceiver that receives a request including a filtering rule from a watcher client device; and
   a processor which controls to store a notification blocking filter corresponding to the filtering rule in a memory, when the request has been authorized using authorization related information,
   wherein the filtering rule is defined based on presence attributes of the watcher client device, and
   wherein the authorization related information is stored in the presence server device or a presence Extensible Markup Language (XML) Document Management Server (XDMS).

2. The presence server device as claimed in claim 1, wherein the watcher client device is authorized to watch presence information of a user.

3. The presence server device as claimed in claim 1, wherein:
   the processor checks the presence attributes of the watcher client device based on the notification blocking filter, when the presence notification is generated to the watcher client device;
   the presence notification comprises the presence attributes as requested by the watcher client device; and
   when the presence attributes of the watcher client device do not match the notification blocking filter, the transceiver sends the presence notification to the watcher client device.

4. A method for providing a presence notification, the method comprising:
   receiving, at a presence server, a request including a filtering rule from a watcher client, wherein the filtering rule is defined based on presence attributes of the watcher client; and
   storing, at the presence server, a notification blocking filter corresponding to the filtering rule, when the request has been authorized using authorization related information,
   wherein the authorization related information is stored in the presence server or a presence Extensible Markup Language (XML) Document Management Server (XDMS).

5. The method as claimed in claim 4, wherein the watcher client is authorized to watch presence information of a user.

6. The method as claimed in claim 4, further comprising:
   checking the presence attributes of the watcher client based on the notification blocking filter, when the presence notification is generated to the watcher client, wherein the presence notification comprises the presence attributes as requested by the watcher client;
   wherein, when the presence attributes of the watcher client do not match the notification blocking filter, the presence notification is sent to the watcher client.

7. The method as claimed in claim 4, further comprising enabling or disabling the filtering rule according to a request of the watcher client.

8. The method as claimed in claim 4, further comprising removing the filtering rule according to a request of the watcher client.

9. The method as claimed in claim 4, wherein the filtering rule comprises detailed conditions to be checked before sending the presence notification, and the method further comprises:
   evaluating the detailed conditions, when the request is received; and
   sending a positive presence response to the watcher client, when the presence server is able to handle the detailed conditions.

10. A method for receiving a presence notification, comprising the steps of:
    generating, at a watcher client, a request including a filtering rule, wherein the filtering rule is defined based on presence attributes of the watcher client;
    sending the request to a presence server; and
    receiving the presence notification of another client from the presence server, when the request has been authorized using authorization related information stored in the presence server or a presence Extensible Markup Language (XML) Document Management Server (XDMS) and the presence notification has satisfied the filtering rule.

11. The method as claimed in claim 10, further comprising sending a request for enabling or disabling the filtering rule.

12. The method as claimed in claim 10, further comprising sending a request for removing the filtering rule.

13. A client device for receiving presence notification, comprising:
    a processor that generates a request including a filtering rule; and
    a transceiver that sends the request to a server device, and receives, from the server device, the presence notification of another client device, when the request has been authorized using authorization related information stored in the server device or a presence Extensible Markup Language (XML) Document Management Server (XDMS) and the presence notification has satisfied the filtering rule, wherein the filtering rule is defined based on presence attributes of the client device.

14. A presence server device for providing presence notification, comprising:
    a transceiver that receives a request including a filtering rule from a watcher client device and receives the presence notification from another client device; and
    a processor that determines whether the presence notification has passed a notification blocking filter corresponding to the filtering rule,
    wherein the transceiver sends the presence notification to the watcher client device based on determining that the presence notification has passed the notification blocking filter, and wherein the filtering rule is defined based on presence attributes of the watcher client device,
    wherein the processor further controls to store the notification blocking filter in a memory when the request has been authorized using authorization related information, and
    wherein the authorization related information is stored in the presence server device or a presence Extensible Markup Language (XML) Document Management Server (XDMS) device.

15. The presence server device as claimed in claim 14, wherein the processor checks the presence attributes of the watcher client device based on the notification blocking filter, when the presence notification is generated to the watcher client device, wherein the presence notification comprises the presence attributes as requested by the watcher client device; and
    when the presence attributes of the watcher client device match the notification blocking filter, the transceiver sends the presence notification to the watcher client device.

16. A method for providing presence notification, the method comprising:
- receiving, at a presence server, a request including a filtering rule from a watcher client, wherein the filtering rule is defined based on presence attributes of the watcher client; and
- receiving the presence notification from another client;
- determining whether the presence notification has passed a notification blocking filter corresponding to the filtering rule; and
- sending the presence notification to the watcher client based on determining that the presence notification has passed the notification blocking filter, wherein the authorization related information is stored in the presence server or a presence Extensible Markup Language (XML) Document Management Server (XDMS).

17. The method as claimed in claim 16, further comprising storing the notification blocking filter in a memory when the request has been authorized using authorization related information.